United States Patent [19]

Finelli et al.

[11] 4,137,384

[45] Jan. 30, 1979

[54] ACCELERATOR FOR CURING CHLORINATED ETHYLENICALLY UNSATURATED POLYMERS

[75] Inventors: Anthony F. Finelli, Akron; Thomas G. Hutchins, Uniontown, both of Ohio

[73] Assignee: The Goodyear Tire & Rubber Company, Akron, Ohio

[21] Appl. No.: 855,645

[22] Filed: Nov. 30, 1977

[51] Int. Cl.² ............................ C08F 8/30; C08F 8/34; C08F 8/42
[52] U.S. Cl. .................................... 526/35; 526/47.3; 526/47.8; 526/48.4; 526/50
[58] Field of Search ....................... 526/48.4, 47.8, 30, 526/35, 47.3, 50

[56] References Cited

U.S. PATENT DOCUMENTS

| | | | |
|---|---|---|---|
| 3,183,207 | 5/1965 | Nimoy et al. | 526/48.4 |
| 3,351,677 | 11/1967 | Barton et al. | 526/48.4 |

OTHER PUBLICATIONS

Whitby –Synthetic Rubber (Wiley) 1954 pp. 776, 777, 780, 781, 788, 789.

Primary Examiner—William F. Hamrock
Attorney, Agent, or Firm—J. D. Wolfe

[57] ABSTRACT

Thioperimidone has been discovered to be useful as an accelerator in the curing of chlorinated ethylenically unsaturated polymers such as polychloroprene with metal oxides such as magnesium oxide or zinc oxide.

6 Claims, No Drawings

ACCELERATOR FOR CURING CHLORINATED ETHYLENICALLY UNSATURATED POLYMERS

This invention relates to a new accelerator for the curing of polychloroprene and related chlorinated ethylenic unsaturated polymers.

The chlorinated polymers utilize metal oxides in conjunction with ethylene thiourea and related materials as curatives but these curatives have certain defects.

The object of this invention is to provide a curative for use in normal curing systems for polychloroprene and related chlorinated polymers or hydrocarbons that utilize metal oxides as a curative.

The nature of this invention may be more readily understood and appreciated by reference to the following examples wherein all parts and percentages are by weight unless otherwise indicated.

EXAMPLE I

A laboratory banbury mixer was used to prepare a base stock which consisted of the following ingredients:

| Base stock | Parts by Weight |
|---|---|
| Polychloroprene | 100.00 |
| SRF carbon black | 60.00 |
| Napthenic Process Oil | 20.00 |
| Magnesium oxide | 4.00 |
| Amine antioxidants | 2.00 |
| Stearic Acid | 1.00 |
| Total | 187.00 |

To this base stock were added on a laboratory mixing mill various ingredients to effect a cure and/or accelerate the cure of the compound.

The compounds were subjected to standard laboratory testing procedures to determine the effect of the additional chemicals on the stock. Stress-strain tests were made on samples of each compound following a press cure at 160° C. The duration of cure was equal to the time required to reach 90 percent of the torque level at 30 minutes as tested by the oscillating disk rheometer.

The added ingredients and the test results are listed in the following table (see Table 1).

Table 1

| Recipe | 141 | 107 | 126 | 127 | 128 | 129 |
|---|---|---|---|---|---|---|
| Base Stock | 187.00 | 187.00 | 187.00 | 187.00 | 187.00 | 187.00 |
| Zinc Oxide | 5.00 | 5.00 | 5.00 | 5.00 | 5.00 | 5.00 |
| Ethylene thiourea | | 0.50 | | | | |
| Thioperimidone | | | 0.25 | 0.50 | 0.75 | 1.00 |
| Totals | 192.00 | 192.50 | 192.25 | 192.50 | 192.75 | 193.00 |
| Laboratory Tests - Mooney Scorch (tested at 132.2° C.) | | | | | | |
| Min. to 5 point rise above minimum | 18.0 | 10.3 | 11.8 | 9.6 | 9.2 | 9.0 |
| Min. to 10 point rise above minimum | 20.0 | 12.0 | 13.5 | 11.5 | 11.0 | 10.7 |
| Oscillating Disk Rheometer Data Tested at 160° C. | | | | | | |
| Torque at 30 min. | 49 | 60 | 55.0 | 58.0 | 60.5 | 61.5 |
| Minimum Torque | 5 | 5 | 6.0 | 6.0 | 7.0 | 7.0 |
| Time to 2 units increase (min.) | 4.5 | 3.25 | 3.5 | 3.0 | 3.25 | 3.25 |
| Time to 90% of torque at 30 min.(min.) | 12.5 | 9.25 | 10.5 | 7.5 | 7.5 | 8.0 |
| Stress-Strain Properties of Stocks following cure at 160° C. | | | | | | |
| Tensile $MN/m^2$ | 15.9 | 17.0 | 15.4 | 15.6 | 15.2 | 15.6 |
| Elongation, % | 470 | 410 | 410 | 430 | 395 | 390 |
| 200% modulus $MN/m^2$ | 6.5 | 7.8 | 6.8 | 6.7 | 7.7 | 8.0 |
| 300% modulus $MN/m^2$ | 10.6 | 13.0 | 11.6 | 11.4 | 12.5 | 12.9 |
| Hardness, Shore A, points | 63 | 65 | 61 | 62 | 63 | 63 |

The results of the tests clearly show that the use of increasing amounts of the chemical, thioperimidone, results in an increased level of torque as measured by the oscillating disk rheometer (ODR) while also resulting in a decreasing time to reach 90 percent of that torque reached in 30 minutes. The changes produced are clearly a change from the results obtained with the use of only the zinc oxide material. The change in ODR data produced by 0.75 part of the chemical thioperimidone are comparable to the changes produced by the use of 0.50 part of the chemical ethylene thiourea.

The stress-strain data clearly show that the use of increasing amounts of the chemical, thioperimidone, produces modulus results which are improved from the modulus resulting from the use of zinc oxide only. The modulus results also show that the use of 0.75 to 1.00 part of thioperimidone produces readings comparable to the modulus produced by the use of 0.50 part of ethylene thiourea.

EXAMPLE II

Thioperimidone may also be used in combination with other polychloroprene accelerators as shown in the following example for an improved level of cure.

To the base stock outlined in Example I, additional ingredients were added using a laboratory mixing mill. The resulting stocks were subjected to laboratory tests to determine the effect of the various added ingredients. The added ingredients and the test results are outlined in the following table (See Table 2).

Table 2

| Recipe | 136 | 148 | 109 | 144 | 115 | 147 |
|---|---|---|---|---|---|---|
| Base Stock | 187.00 | 187.00 | 187.00 | 187.00 | 187.00 | 187.00 |
| Zinc oxide | 5.00 | 5.00 | 5.00 | 5.00 | 5.00 | 5.00 |
| p,p'-Diaminodiphenyl-methane | 1.00 | 1.00 | | | | |
| Thioperimidone | | 0.25 | | 0.50 | | 0.25 |
| Vanax NP* | | | 0.50 | 0.50 | 0.75 | 1.00 |
| Totals | 193.00 | 193.25 | 192.50 | 193.00 | 192.75 | 193.25 |
| Laboratory Tests - Mooney Scorch Data tested at 132.2° C. | | | | | | |
| Min. to 5 point rise above minimum | 12 | 8.2 | 11.5 | 8.9 | 11.0 | 8.6 |
| Min. to 10 point rise above minimum | 13.5 | 9.3 | 12.6 | 9.8 | 11.8 | 9.1 |
| Oscillating Disk Rheometer tested at 160° C. | | | | | | |
| Torque at 30 min. | 59.0 | 69.0 | 54.0 | 67.0 | 56.5 | 65.0 |
| Minimum Torque | 5.0 | 5.0 | 5.0 | 5.5 | 6.0 | 5.0 |
| Min. to rise of 2 torque points | 4.0 | 3.25 | 3.5 | 3.25 | 3.5 | 3.25 |
| Min. to 90% of torque at 30 min. | 12.5 | 10.5 | 10.0 | 8.0 | 7.5 | 8.0 |
| Stress-Strain Properties of Stocks following cure at 160° C. | | | | | | |
| Tensile, $MN/m^2$ | 15.0 | 16.0 | 15.9 | 16.0 | 15.2 | 15.7 |
| Elongation, % | 340 | 370 | 425 | 425 | 415 | 420 |
| 200% Modulus $MN/m^2$ | 6.5 | 8.5 | 6.5 | 6.9 | 6.0 | 6.4 |
| Hardness Shore A points | 66 | 64 | 68 | 64 | 62 | 63 |

*®of the R T Vanderbilt Company for a mixture of 20 parts butyl zimate and 80 parts of tetrahydro-3,5-dimethyl-2-hydro-1,3,5-thiadiazine-2-thione.

Instead of polychloroprene other chlorinated resinous and elastomeric ethylenic unsaturated polymers can be used in the above recipes where curable amounts of metal oxides such as magnesium oxide and/or zinc oxide are present, usually in about 1 to 10, and preferably 3 to 6 parts, and an accelerating amount of thioperimidone, sometimes called napth(1,8-de) imidazol-2-thione, is present, usually in 0.2 to 5 parts, and preferably 0.5 to 2 parts per 100 parts of polymers; alternately 10 to 80 parts of filler such as the carbon blacks or inorganic fillers of the silica type can be used along with 10 to 100 parts of the usual plasticizers for polychloroprene.

While certain representative embodiments and details have been shown for the purpose of illustrating the invention, it will be apparent to those skilled in this art that various changes and modifications may be made therein without departing from the spirit or scope of the invention.

What is claimed is:

1. A curable chlorinated ethylenically unsaturated polymer composition comprising a 100 parts by weight of a chlorinated ethylenically unsaturated polymer containing mixed therein a curable amount of a metal oxide selected from the class consisting of zinc oxide and magnesium oxide, and an accelerating amount of thioperimidone.

2. The composition of claim 1 wherein the metal oxide is present in 1 to 10 parts per 100 parts of polymer.

3. The composition of claim 1 wherein thioperimidone is present in about 0.2 to 5 parts per 100 parts of polymer.

4. The composition of claim wherein 10 to 80 parts of filler is present.

5. The composition of claim 1 wherein the metal oxide is zinc and magnesium.

6. The composition of claim 3 wherein the metal oxide is zinc and magnesium.

* * * * *